US011438642B2

(12) United States Patent
Sinnott et al.

(10) Patent No.: US 11,438,642 B2
(45) Date of Patent: Sep. 6, 2022

(54) SYSTEMS AND METHODS FOR DISPLAYING MULTIPLE MEDIA ASSETS FOR A PLURALITY OF USERS

(71) Applicant: Rovi Guides, Inc., San Jose, CA (US)

(72) Inventors: Joseph Sinnott, Palo Alto, CA (US); David Shoop, San Jose, CA (US); Dylan M. Wondra, Mountain View, CA (US); Todd Kulick, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/410,069

(22) Filed: Aug. 24, 2021

(65) Prior Publication Data
US 2021/0385518 A1  Dec. 9, 2021

Related U.S. Application Data

(63) Continuation of application No. 16/658,727, filed on Oct. 21, 2019, now Pat. No. 11,128,907, which is a continuation of application No. 16/110,714, filed on Aug. 23, 2018, now Pat. No. 10,491,940.

(51) Int. Cl.
| H04N 21/442 | (2011.01) |
| H04N 21/414 | (2011.01) |
| H04N 21/45  | (2011.01) |
| H04N 21/482 | (2011.01) |
| H04N 21/485 | (2011.01) |

(52) U.S. Cl.
CPC . *H04N 21/41415* (2013.01); *H04N 21/44226* (2020.08); *H04N 21/4532* (2013.01); *H04N 21/4821* (2013.01); *H04N 21/4858* (2013.01)

(58) Field of Classification Search
None
See application file for complete search history.

(56) References Cited

U.S. PATENT DOCUMENTS

| 4,644,509 A  | 2/1987 | Kiewit et al. |
| 4,858,000 A  | 8/1989 | Lu |
| 6,396,506 B1 | 5/2002 | Hoshino et al. |
| 7,165,098 B1 | 1/2007 | Boyer et al. |
| 7,565,671 B1 | 7/2009 | Ritter et al. |

(Continued)

FOREIGN PATENT DOCUMENTS

| EP | 1843591 A1 * | 10/2007 | ........... G11B 27/105 |
| WO | WO-2007113580 A1 * | 10/2007 | ........... G11B 27/105 |
| WO | W02009157997 | 12/2009 | |

OTHER PUBLICATIONS

PCT International Search Report and Written Opinion for PCT Application No. PCT/US2019/047890, dated Jan. 2, 2020 (16 pages).

*Primary Examiner* — William J Kim
(74) *Attorney, Agent, or Firm* — Haley Guiliano LLP

(57) ABSTRACT

Systems and methods for delivering multiple media assets for a plurality of users are disclosed herein. A plurality of users proximate to a display device may detected and split into groups based on preference for a specific media asset. Media assets may be generated on a display device in a layout based on the number of users in each group. When a new user enters the proximity of the display device the group membership may be recalculated and based on the new group memberships the display layout may be updated.

20 Claims, 10 Drawing Sheets

(56) References Cited

U.S. PATENT DOCUMENTS

| | | |
|---|---|---|
| 7,761,892 B2 | 7/2010 | Ellis et al. |
| 7,985,134 B2 | 7/2011 | Ellis |
| 8,046,801 B2 | 10/2011 | Ellis et al. |
| 9,762,945 B2 | 9/2017 | Klappert et al. |
| 9,852,774 B2 | 12/2017 | Golyshko |
| 10,084,970 B2 | 9/2018 | Gandhi et al. |
| 11,128,907 B2 | 9/2021 | Sinnott et al. |
| 2002/0070957 A1 | 6/2002 | Trajkovic et al. |
| 2002/0174430 A1 | 11/2002 | Ellis et al. |
| 2003/0001908 A1 | 1/2003 | Cohen-Solal |
| 2005/0157948 A1 | 7/2005 | Lee |
| 2005/0251827 A1 | 11/2005 | Ellis et al. |
| 2006/0282856 A1 | 12/2006 | Errico et al. |
| 2007/0211174 A1 | 9/2007 | Putterman et al. |
| 2007/0250867 A1 | 10/2007 | Kuwabara et al. |
| 2008/0046930 A1 | 2/2008 | Koch et al. |
| 2008/0062318 A1 | 3/2008 | Ellis et al. |
| 2009/0037949 A1 | 2/2009 | Birch |
| 2009/0285545 A1 | 11/2009 | Bon |
| 2010/0007796 A1 | 1/2010 | Kobayashi et al. |
| 2010/0064312 A1 | 3/2010 | Francis et al. |
| 2010/0138767 A1 | 6/2010 | Wang et al. |
| 2011/0069940 A1 | 3/2011 | Shimy et al. |
| 2011/0173662 A1 | 7/2011 | Beppu |
| 2012/0060177 A1 | 3/2012 | Stinson et al. |
| 2012/0124456 A1 | 5/2012 | Perez et al. |
| 2012/0324550 A1 | 12/2012 | Wasilewski |
| 2013/0093670 A1 | 4/2013 | Iwai |
| 2013/0152129 A1 | 6/2013 | Alberth et al. |
| 2014/0189720 A1 | 7/2014 | Terrazas |
| 2014/0208262 A1 | 7/2014 | Huang et al. |
| 2014/0215504 A1 | 7/2014 | Hsiao et al. |
| 2014/0333531 A1 | 11/2014 | Phang et al. |
| 2014/0359647 A1 | 12/2014 | Shoemake et al. |
| 2015/0189378 A1 | 7/2015 | Soundararajan et al. |
| 2015/0312604 A1 | 10/2015 | Hoctor et al. |
| 2016/0029057 A1 | 1/2016 | Wickenkamp |
| 2016/0066034 A1 | 3/2016 | Hicks |
| 2016/0127775 A1 | 5/2016 | Zilberstein et al. |
| 2016/0171220 A1 | 6/2016 | Yu |
| 2016/0198223 A1 | 7/2016 | Maluk et al. |
| 2016/0366485 A1 | 12/2016 | Nishimura |
| 2017/0094355 A1 | 3/2017 | Mccarty et al. |
| 2017/0251260 A1 | 8/2017 | Sanders |
| 2017/0289596 A1 | 10/2017 | Krasadakis et al. |
| 2017/0332139 A1* | 11/2017 | Blake .................. H04N 21/252 |
| 2018/0035166 A1 | 2/2018 | Truong et al. |
| 2018/0091854 A1 | 3/2018 | Greenberger et al. |
| 2018/0129514 A1 | 5/2018 | Lefevre et al. |
| 2018/0160054 A1 | 6/2018 | Gandhi et al. |
| 2018/0352294 A1 | 12/2018 | Compton |
| 2019/0045274 A1* | 2/2019 | Parks .................. H04N 21/812 |
| 2019/0132646 A1 | 5/2019 | Bharti et al. |
| 2019/0188756 A1* | 6/2019 | Bradley ................ G06V 40/16 |
| 2019/0281350 A1* | 9/2019 | Ward .................. H04N 21/435 |

\* cited by examiner

500

| User ID | Device Map |
|---|---|
| Jane D. | 1, 3, 5 |
| Stella H. | 1, 2, 3 |
| Sheilah R. | 1, 5 |
| John M. | 1, 2, 3, 4, 7 |
| Roger W. | 3, 4, 6, 9 |

User Profile

| User ID | Attributes |
|---|---|
| Jane D. | Sports, New York Jets, New York Mets<br>Comedy<br>Classic Movies<br>Patrick Melrose<br>Benedict Cumberbatch<br>Binge Series<br>This is Us<br>Arrested Development<br>The Simpsons |

FIG. 6

SYSTEMS AND METHODS FOR DISPLAYING MULTIPLE MEDIA ASSETS FOR A PLURALITY OF USERS

CROSS-REFERENCE TO RELATED APPLICATIONS

This application is a continuation of U.S. patent application Ser. No. 16/658,727, filed Oct. 21, 2019, which is a continuation of U.S. patent application Ser. No. 16/110,714 (now U.S. Pat. No. 10,491,940) filed Aug. 23, 2018. The disclosures of which are hereby incorporated by reference herein in their entireties.

BACKGROUND

Media content may be presented in an environment with multiple viewers in a way where multiple programs are displayed that are of interest to the multiple viewers. In some scenarios, viewers may wish to view the same media content. In other scenarios, viewers may wish to view different media content. In yet other scenarios, only a few viewers may wish to view certain media content while more viewers may wish to view other media content. Often, viewers need to select the media asset to begin viewing. In a location with multiple viewers requiring each viewer to select a media asset to commence viewing may be laborious and inconvenient. In addition, when multiple media assets are available for display, it may be difficult to determine which media to display for which of the viewers. Providing a media display with multiple media assets for viewers without requiring a viewer selection, may improve a viewer's ability to access media, particularly for media that is important or interesting for the viewer. In addition, keeping the media display suitable and relevant to the audience of users may be difficult when users change locations or change their access to a display.

SUMMARY

The advancement of data transmission and availability of digital media has made it possible to access media from multiple sources on multiple devices. Although more and more people have personal viewing devices, and in some cases, multiple personal viewing devices, supplying media content for viewers automatically that is interesting or relevant for the viewer, displayed at a suitable time and location, displayed without requiring the viewer to affirmatively select or access the media content will improve a viewer's viewing experience by efficiently displaying media that the viewer needs or wishes to view in a place and manner that is helpful for the viewer. There are many environments in which there are multiple viewers actively or passively watching a display screen (or display screens) together, such as in a conference room, waiting room, common area, or other location. Such display screens may show one or more media assets that may be general interest programming, or somewhat tailored to the general audience. To improve on this experience, a media system, such as a media guidance application, may generate media content, for display to the viewers, that is customized to the viewers presently surrounding the display device, and that is displayed in a configuration using audience information. To provide such customized displays, the media guidance application may obtain information about display devices available in a particular location and reference data about audience members present in the vicinity of the display devices, and data about the viewers, including, for example, viewer media preferences and associated media devices to provide a display that can include media that is interesting to many of the viewers and presented in a manner that considers the preferences of viewer cohorts in the audience. The media guidance application may use media asset metadata, as well as viewer data to automatically generate displays of media assets for the audience. In addition, the media guidance application may generate media assets for display in a layout configuration that is suitable for the audience.

Accordingly, to overcome the limitations of generic media displays, a media guidance application may obtain information about media assets that may be available for viewing. In an example, in a sports bar, timely sporting event programming may be selected to display on one or more screens in the sports bar. In another example, in a conference room, one or more media assets relating to corporate projects, lectures, such as a live feed, for example, may be selected for display. The media guidance application may obtain information about viewers within viewing range of display devices in a location. For example, in the sports bar, a media system may recognize customers using information obtained from an associated device such as a mobile phone or smart watch, when a customer logs into a food service food ordering application, using cameras and facial recognition techniques, or other identification techniques. In a conference room environment, viewers, for example, employees, may be recognized using an employee badge, cameras with facial recognition techniques, work laptop logins or other technique. Such recognition techniques may be authorized by a viewer. In particular, the recognition techniques may be used in connection with a database of device assignments which can be used by the media system to identify suitable devices on which to display media assets for a particular user. Generally speaking, the database of device assignments may include multiple devices that are available for a user. For example, a user may be assigned or associated with a smartphone, a personal tablet, a work computer, conference room display screen, work building lobby display, work building elevator screen, home television, home computer, local restaurant display screen, local sports bar display screens, and other such devices. A user may control such device assignments. Other organizations may be authorized to assign the user with devices associated with the user. The database of device assignments may be used to identify displays that may be near a user that are suitable for displaying media content. The media system generating such media content display may obtain display associations for many viewers so that display screens in various locations can be used to show media content that is relevant for the audience near the display screen.

In an embodiment, a media guidance application may deliver multiple media assets for a plurality of users. The multiple media assets may be any media assets that are available for displaying by the media guidance application. The media guidance application may detect a plurality of users proximate to a display device. The media guidance application may detect the user proximity to the display device using various techniques. For example, in a conference room environment, users may be detected by a user's employee badge, a user's connection to a conference bridge, camera recognition or other technique. In another scenario, audience members in a theater may be recognized based on tickets used for entry to the theater and information about the viewer's seat location. In another scenario, students in a classroom may be recognized based on student profile information and logins in a school network. In another example, customers in a sports bar may be detected by the media guidance application using restaurant table management software, explicit login access by the customer, camera recognition, or other technique. In any of these scenarios, users may also be recognized by the media guidance application by use of a handheld device, such as a smartphone or smartwatch. Such device may include an application capable of communicating with the media guidance application over a network to supply location information for the device. Such information may be supplied to the media guidance application by the user pushing the information in the application or based on proximity to devices associated with the users and which are available for displaying media content by the media guidance application.

The plurality of users that are detected to be in the proximity of the display are generally able to view media content on the display device. The plurality of users may be assigned to a viewer group, such as a first set or second set of users. For the purposes of clarity, scenarios with two sets of users will be discussed herein. However, it should be noted that any number of user sets may be accommodated. The sets of viewers may be organized according to user preference profiles and media available to be displayed on the display device. Generally, each user may be assigned to one set of viewers. In some scenarios, however, a user may have a profile that matches both viewer sets. In such case, one user may be assigned to both sets. The sets of viewers may be organized by matching user profiles and available media. For example, a first set of users may include users that have a preference profile that is aligned with characteristics of a first media asset, while a second set of users may include users that have a preference profile that is aligned with characteristics of a second media asset. The first media asset and second media asset that are available for displaying on the device may be selected for the display based on time, access, location, or other basis. For example, in a conference room setting, corporate video clips, training videos, video conferences, or other media may be available for display. In a sports bar setting, the media assets may be selected based on sporting events that are currently playing. When available media changes, and when users change location, the sets of viewers may change. The viewer assignments to the sets of users may be stored in a database and updated by a media guidance application as needed.

The media guidance application may generate on the display device the media assets, for example, the first available media asset and the second available media asset. The media assets may be obtained by the media guidance application and displayed on the display device so that the first media asset and the second media asset may be viewed by the viewers. A layout for the first media asset and the second media asset in the display may be selected by the media guidance application using information about the sets of viewers. For example, a layout configuration of the two media assets may be based on an amount of users in the first set of users as well as an amount of users in the second set of users. For example, if there are many more users in one of the user sets, a layout for the display of the media assets may include the media asset for the larger group sized relatively larger than the other media asset which may be associated with a smaller group. In other examples, the display configuration may be based on other characteristics of the audience such as user importance, proximity, and other factors.

If the audience shifts and users change locations or move out of view of the display device, the media guidance application may change the layout configuration of the media assets to reflect any changes in the audience. The configuration update may be helpful in keeping the display relevant to the audience. In some scenarios, timing of the media asset playback may also be changed to be suitable to the audience so that the media asset is played at the right or appropriate time segment.

The media guidance application may detect that a new user is proximate to the display device. In some embodiments, the media guidance application may also detect that the user is able to view the display device. The detection of the new user may be performed using sensing components such as a camera, device sensor, or other technology capable of detecting that a new user has joined an audience near the display device. The media guidance application will attempt to identify the new user so that the user's preference profile can be obtained and used by the media guidance application to assign the new user with one or the other of the sets of viewers. The new user may be assigned to the set of users for a media asset for which the user has a preference profile that is aligned with characteristics for the media asset. In some scenarios, a user may not be identifiable in which case the user may not be assigned to either of the sets of viewers. In another scenario, the user may be assigned to both sets of viewers so that the presence of the viewer does not affect a relative ratio among the two sets of users.

In some embodiments, when the new user is added to one of the sets of users, for example, the first set of users, the media guidance application will check to see whether the addition of the new user changes the make-up of the audience. Some changes to the audience composition may be minor and so a change to the layout configuration of the media assets may not be warranted. In some other scenarios, however, the addition of a user to one of the groups may cause the balance of the audience to shift more towards one of the media assets. In this case, the media guidance application may update the display layout of the media assets to a new configuration that reflects the composition of the audience. To evaluate the audience composition following the addition of the new user to the first set of users, the media guidance application will compare the amount of users in the first set and the amount of the second users with a threshold amount setting. The threshold may be set by a system manager or set to a default setting. The threshold may be used by the media guidance application so that certain small changes to a size or amount of a set of users do not trigger a change to the layout.

If the media guidance application determines that adding the new user to the first set of users changes the amount of users in the first set of users as compared with the amount of users in the second set of users by more than the threshold amount, the media guidance application will adjust the layout of the media assets according to the change, for example, to reflect the change in the size or amount of users in the sets of users.

In some embodiments, when the media guidance application detects that a new user is proximate to the display device, the media guidance application may attempt to determine the importance of the new user. The determination of the new user's importance may be performed using a combination of sensing component and the new user's profile. In some embodiments, the media guidance application may also detect that the new user is able to view the display device. In one example, the media guidance application may identify the new user as the owner of a bar in which media is playing. In response, the media guidance application may assign the bar owner to a set of viewers and display more prominently the content corresponding to the set of users to which the bar owner belongs, regardless of the ratio of the two sets of viewers. As another example, the media guidance application may determine that the new user who has entered a conference room is the company's president. In response, the media guidance application may display more prominently content that corresponds to the preferences of the set of users to which the president belongs, regardless of the ratio of the two sets of users.

In some embodiments, the media guidance application may use the importance of viewers to weigh each viewer's impact on the content display relative to other viewers. For example, the media guidance application may recognize that the bar owner is present in a bar with 50 other users and assign the bar owner to the first of two user sets. Based on its determination of viewer importance, the media guidance application may further determine that all users' preferences should be weighted equally except for the bar owner, who should be weighted 30 times as heavily as each other user. In this example, it is possible that the media asset corresponding to the first user set may be displayed as prominently as or more prominently than the media asset corresponding to the second user set even if the first user set is much smaller than the second user set.

In some embodiments, the media guidance application may deliver multiple media assets for a plurality of users by executing the following actions. The media guidance application may assign users into two or more groups based on a preference for a specific characteristic for media. Specifically, the media guidance application may assign, each of a plurality of users proximate to a display device, to a first set of users or a second set of users, where each of the users in the first set of users has a media asset preference profile having a preference for a first characteristic of a first available media asset, and wherein each of the users in the second set of users has a media asset preference profile having a preference for a second characteristic of a second available media asset. For example, the media guidance application may split users present in a location into a first set that prefers a first type of content (e.g., news) and a second type of content (e.g., sports).

The media guidance application may generate a display layout for two media programs based on an amount of users in each set. Specifically, the media guidance application may generate, on the display device, the first available media asset and the second available media asset, where a layout for the first available media asset and the second available media asset on the display is configured based on characteristics of the first set of users, such as amount of users, importance of particular users, or other relevant factors, as compared with corresponding characteristics of the second set of users. For example, if more users in a location prefer a first type of content (e.g., news) than a second type of content (e.g., sports) the media guidance application may generate for display the news program and the sports program in such a way that the news program takes more space on the display than the sports program.

The media guidance application may identify a new user entering a location and retrieve that user's media asset preference profile. Specifically, the media guidance application may detect a new user proximate to the display device, and retrieve a media asset preference profile for the new user. For example, the display device may include a camera or another proximity sensor, and use that sensor to identify a new user within the proximity of the display. The media guidance application may use a user identity to retrieve a media asset preference profile of the user (e.g., over a network).

The media guidance application may determine, based on the user's media preference profile that the new user enjoys a specific type of media. Specifically, the media guidance application may determine that the new user has a media asset preference profile having the first characteristic. For example, the media guidance application may analyze the user's media preference profile and determine that the user enjoys the news more than sports.

The media guidance application may retrieve a threshold ratio of users needed for changing the layout of the display. Specifically, the media guidance application may retrieve a threshold setting for the first set of users and the second set of users, the threshold setting indicative of an increment to either of the first set of users and the second set of users and relative to a total set of users in the first set of users and the second set of users. For example, the media guidance application may retrieve the threshold from memory. The threshold may be a ratio of a first set of users to the second set of users needed for a change, a percentage of users in the first set as compared to the second set needed for change, or another suitable value.

The media guidance application may determine whether adding the new user to one of the sets changing the relation of the sets to each other to warrant a change of layout of the two media assets. Specifically, the media guidance application may determine whether adding the new user to the first set of users changes the amount of users in the first set of users as compared with the amount of users in the second set of users by more than the threshold setting. For example, the threshold may include a ratio of users needed to change the layout of the display. In one specific scenario, the location may have an equal number of users that enjoy sports and news, and a media asset that is a sports game may be using a larger amount of display space versus a news program. However, a new user that enters the location may enjoy news more than sports, and as a result change the ratio of users that enjoy the news to users that enjoy sports. The media guidance application may detect that change.

If the change in the amount of the first set as compared with the second set creates two sets that are different by a threshold amount, the media guidance application may modify the layout of the screen. Specifically, the media guidance application may, in response to determining that adding the new user to the first set of users changes the amount of users in the first set of users as compared with the amount of users in the second set of users by more than a threshold setting, adjust the display layout of the first available media asset and the second available media asset according to the change. For example, the media guidance application may change the relative size of each displayed media asset. Alternatively or additionally, the media guidance application may adjust the location of the two media assets as laid out on the display. In some embodiments, the size of the first media asset displayed may be directly proportional to the number of users in each set. For example, if there are 50 users in each set, each displayed media asset may be of equal size. If there are 60 users in the first set and 40 in the second set, the ratio of the sizes of the two media assets may be 60 to 40. In some embodiments, the layout of the display may be changed based on a number of users that are located on each side of the display. For example, if 35 out of 60 users that like the first media asset are now located on the right of the screen, the media guidance application may move the displayed first media asset to the appropriate side of the screen.

In some embodiments, changes in the composition of the audience may cause the media guidance application to change other aspects of the media presentation. For example, the media guidance application may adjust the volume of each media asset, the color display or brightness of each media asset, the layering of media assets, or a number of other features of the presentation.

In some embodiments, the media guidance application may react appropriately when users leave the proximity of the display. For example, if enough users leave, the media guidance application may adjust the layout accordingly. The media guidance application may perform the following actions reacting to users leaving the proximate location of the display. The media guidance application may detect that a user in the first set of users has left the field of view of the display. For example, the media guidance application may use a camera or another sensor to determine that the person has left the location (e.g., a person left the conference room, or a bar, or another suitable location).

The media guidance application may, in response, remove the user from the set/group that the user has been part of. Specifically, the media guidance application may remove the user of the first set of users that has left the field of view of the display from the first set of users. For example, if a user that left the location was in the group that preferred the news program, the media guidance application may remove that user from the group of users that prefer the news.

The media guidance application may recalculate the group membership responsive to change of the group composition (e.g., when a user is taken out of a group). Specifically, the media guidance application may determine a new amount of users in the first set of users without the user that has left the field of view. For example, if the group of users that prefers the news had fifty users and one user was removed from the group, the media guidance application may calculate the total number of users in the group as forty-nine.

The media guidance application may determine whether the change in group membership creates user numbers in the group that exceeds a threshold. Specifically, the media guidance application may determine whether the new amount of users in the first set and the amount of users in the second set of users differ by more than the threshold setting. For example, if a threshold dictates a change in layout when a percentage of users in the first set exceeds a percentage of users in the second set, the media guidance application may perform that determination.

In response to determining that a respective number of users in the updated sets changes the ratio of users by more than a threshold amount, the media guidance application may adjust the layout of the display. Specifically, the media guidance application may, in response to determining that the new amount of users and the amount of users in the second set of users exceeds the threshold setting, adjust the display layout of the first available media asset and the second available media asset based on the new amount of users in the first set of users as compared with an amount of users in the second set of users. For example, if the user that preferred the news left the location, and that event created a condition where the first set now included less than one third of the total users and the second set now included more than two thirds of the users, the media guidance application may change the layout to increase the size of the appropriate media asset and/or change the location of the other media asset. For example, if the majority of users that prefer the other media asset, are now on one side of the screen, the control circuitry may change the layout to put that media asset to the appropriate side of the screen.

In some embodiments, when the user leaves the location, the user may still want to continue consuming the media asset the user was consuming at that location. The media guidance application may accommodate that user. The media guidance application may detect that one of the users in the first set of users has left the field of view of the display. For example, the user may have left a conference room, or a bar. The user may be tracked with a camera, GPS device, or another sensor.

The media guidance application may identify other devices that the user can access. Specifically, the media guidance application may retrieve a set of alternate display devices available to the user that has left the field of view of the display. For example, the media guidance application may access the user's profile to determine that a user has a smartphone capable of playing media content. In another example, the media guidance application may determine that the user has entered a field of view of a different display capable of playing media content.

The media guidance application may determine which of the user's detected devices are able to access the media asset. Specifically, the media guidance application may determine whether the first available media asset is available for display on any of the alternate display devices. For example, if the user preferred a news program over a sports game, the media guidance application may determine which of the user's devices can access and play the news program.

Upon finding a device that can access and play the media asset that the user preferred in the location that the user has left, the media guidance application may play the media asset on that device. Specifically, the media guidance application may, in response to determining that the first available media asset is available for display on a first display of the set of alternate display, generate a display screen of the first available media asset on the first display. For example, the media guidance application, may determine that the news program may be played on the user's smartphone and play the news program. In some embodiments, the media guidance application, instead of playing the news program, may download the news program to the identified device and enable the user to play the program later from the beginning or from the point when the user walked out of the location.

In some embodiments, the media guidance application may adjust the layout of the display when one or more users start consuming the content available on the display on a different device (e.g., another display or their own smart phone). The media guidance application may detect that a user in the first set of users has begun viewing the first available media asset on an alternate device. For example, the media guidance application may be managing multiple display devices (e.g., in a conference space or a bar). Each display device may include a camera or another sensor that can detect that a user is looking at that display device versus another display device. The media guidance application may determine using the camera or a sensor that the user has turned away to another device. In some embodiments, the media guidance application may determine, using the camera or another sensor, that the user is now looking at the user's own device.

The media guidance application may upon detecting that the user is consuming the media content from a different device, recalculate the numbers of the different groups of users that are viewing media from the display. Specifically, the media guidance application may remove the user of the first set of users that has begun viewing the first available media asset on the alternate device, and determine a new amount of users in the first set of users without the user that has begun viewing the first available media asset on the alternate device. For example, if the user that prefers a news program over a sports game is now watching that news program on another display or a person device, the media guidance application may remove the user from the appropriate set and calculate the new number of users in the set.

The media guidance application may determine whether the new number of users in the first set changes the difference between the numbers in the first and second sets by more than a threshold amount. Specifically, the media guidance application may determine whether the new amount of users in the first set and the amount of users in the second set of users differ by more than the threshold setting. For example, if after the user that was removed from the first set changed the ratio of the number of users in the first set to the second set in such a way that the ratio is now lower than 2 to 1, the media guidance application may change the layout of the display. Specifically, in response to determining that the new amount of users and the amount of users in the second set of users exceeds the threshold setting, the media guidance application may adjust the display layout of the first available media asset and the second available media asset based on the new amount of users in the first set of users as compared with an amount of users in the second set of users.

In some embodiments, the media guidance application may generate for display two programs sized according to the display size and the ratio of the number of users preferring the first program versus the second program. Specifically, the media guidance application may retrieve information for the display device, the information indicating a size of the display. For example, the control circuitry may retrieve the resolution of the display device (e.g., 1,920×1,080) or size of the display (e.g., 55 inches).

The media guidance application may generate for display the two programs according to the display size (and/or resolution). Specifically, the media guidance application may generate a display for the display device having a first window for the first available media asset, the first window sized according to the size of the display and a ratio of the first set of users to the second set of users, and generate a second window in the display screen for the display device, the second window sized according to the size of the display and a ratio of the second set of the users to the first set of users. For example, if the first set of users includes one third of the users and the second set of users includes two thirds of the users, the media guidance application may generate the first program using one third of the retrieved display size/resolution and the second program using two thirds of the display size/resolution.

In some embodiments, the media guidance application may distribute the audio/subtitle data for different programs that are being displayed on the display device. Specifically, the media guidance application may in response to determining that the amount of users in the first set of users is greater than the amount of users in the second set of users, play an audio output for the first available media asset on the display device and generate a display of closed caption content for the second available media asset. For example, if the news program is preferred by more viewers of a sports game in a bar, the media guidance application may play the sound of the news and show closed captions/subtitles for the sports game.

In some embodiments, the media guidance application may determine other devices available for users that prefer a program that does not have the associated audio playing and play the audio of that program on an available device. Specifically, the media guidance application may retrieve a table of assignments of users in the second set of users and devices available for the second set of users and identify a second available device for one of the second set of users. For example, the media guidance application may store a table for every user of devices that the user may be able to hear if the audio is played from those devices. The media guidance application may identify those devices for one or more users that prefer the sports game versus the news program. The media guidance application may play an audio output for the second available media asset on the second available device for the one user of the second set of users. For example, the media guidance application may play the audio of the sports game on one of the devices in the table.

In some embodiments, the media guidance application may determine whether adding the new user to the first set of users changes the amount of users in the first set of users as compared with the amount of users in the second set of users by more than the threshold setting using the following actions. The media guidance application may calculate the amount of users in the first set of users after adding the new user, and calculate the amount of users in the second set of users. For example, the media guidance application may determine that after adding a user in the first set the first set has sixty-seven users and the second set has thirty-two users.

The media guidance application may calculate a ratio of the users who prefer the first media asset and the second media asset. Specifically, the media guidance application may determine a ratio of the amount of users in the first set of users to the second set of users, and compare the first ratio and the second ratio to the threshold setting. For example, the media guidance application may determine that the ratio of users in the first set of users is sixty-seven to thirty-three (i.e., slightly larger than two to one. The threshold may be two to one. Thus, the media guidance application may determine that the ratio of users of the first set to the second set exceeds the threshold.

The media guidance application may, in addition, to number of users in both sets use a priority level of each of the two media assets to determine the layout of the display. Specifically, the media guidance application may retrieve a priority level for the first available media asset and the second available media asset, and determine that the priority level for the first available media asset is higher than the priority level of the second available media asset. For example, the news program may have a higher priority than the sports game because there may be a news break with important news information. The media guidance application may update the display screen layout configuration based on the priority level by increasing a size of a display of the first available media asset to a size associated with the priority level. For example, if the news program was of a less priority than the sports game (e.g., because more users preferred the sports game), and a news event has happened that made the priority of the news now higher than of the sports game, the media guidance application may adjust the size and/or the location of each of the news program and the sports game.

In some embodiments, the media guidance application may monitor the priority levels of each media asset, and update those priorities based on what's happening on those media asset. Specifically, the media guidance application may update one or more of the priority level of the first available media asset and the priority level of the second available media asset based on a change in content in one or more of the first available media asset and the second available media asset. For example, if there is an interesting moment in the sports game, the media guidance application may increase the size of the sports game on the display.

In some embodiments, the media guidance application may add each of a plurality of users proximate to a display device, to a first set of users or a second set of users with the following actions. The media guidance application may retrieve a respective media asset preference profile for each of the plurality of users. For example, the media guidance application may retrieve each profile from a server. Each profile may include one more media asset characteristics that the user prefers.

The media guidance application may retrieve characteristics of the media assets available for display. Specifically, the media guidance application may retrieve the first characteristic for the first available media asset and the second characteristic for the second available media asset. For example, the media guidance application may retrieve a genre of each media asset (e.g., news and sports). The media guidance application may, in response to matching a first of the media asset preference profiles for the plurality of users with the first characteristic, assign a respective user associated with the matching first media asset preference profile to the first set of users. For example, if the user's profile includes a preference for a sports genre and the given media asset is a sports game, the media guidance application may determine a match between the profile and the media asset. The media guidance application may, in response to matching the first of the media asset preference profiles for the plurality of users with the second characteristic, assign the respective user associated with the matching first media asset preference profile to the second set of users. For example, if the user's profile includes a preference for a news genre and the given media asset is a news program, the media guidance application may determine a match between the profile and the media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative example of a device map table, in accordance with some embodiments of the disclosure;

FIG. 6 shows an illustrative example of a user profile, in accordance with some embodiments of the disclosure;

DETAILED DESCRIPTION

In some embodiments, the media guidance application may deliver multiple media assets for a plurality of users by executing the following actions. The media guidance application may assign users into two or more groups based on a preference for a specific characteristic for media. Specifically, the media guidance application may assign, each of a plurality of users proximate to a display device, to a first set of users or a second set of users, where each of the users in the first set of users has a media asset preference profile having a preference for a first characteristic of a first available media asset, and where each of the users in the second set of users has a media asset preference profile having a preference for a second characteristic of a second available media asset. For example, the media guidance application may be controlling a display (e.g., display 100 of FIG. 1). Display 100 may be able to display multiple media assets simultaneously. For the purposes of clarity embodiments with two displayed media assets will be discussed herein. However, it should be noted that any number of media assets may be displayed. The first media asset may be displayed in window 110 of FIG. 1 and a second media asset may be displayed in window 120 of FIG. 0.1. Both window 110 and window 120 may be within display 100. For example, the media guidance application may retrieve a media asset preference profile for each user in the proximity of the display device and compare the user's preferred media asset characteristics from each retrieved preference profile with media asset characteristics of the first media asset and the second media asset. The media guidance application may compare characteristics of the first media asset (e.g., as retrieved from the metadata associated with the first media asset) with the users' preference characteristics for media assets as stored in a corresponding profile. The media guidance application may perform the same comparison for the second media asset. Based on the results of the comparison (i.e., depending on each profile matching either the characteristics of first media asset or the second media asset), the media guidance application may place the user in an appropriate group (i.e., a group associated with the first media asset or a group associated with the second media asset).

Figure 1:
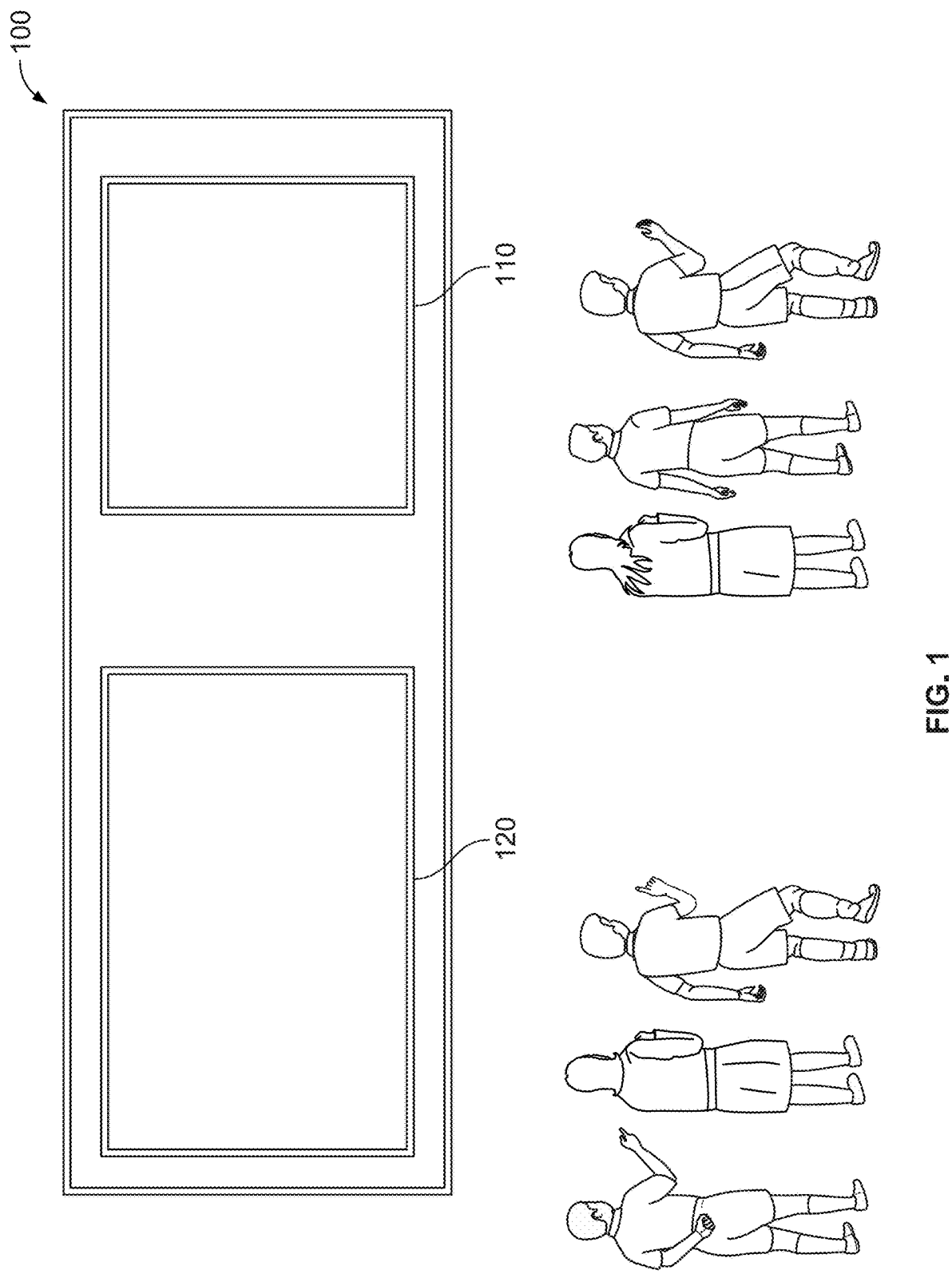
FIG. 1 shows an illustrative example of a plurality of users consuming media assets from a display device that is able to display more than one media asset, in accordance with some embodiments of the disclosure.

The media guidance application may generate a display layout for two media programs based on an amount of users in each set. Specifically, the media guidance application may generate, on the display device, the first available media asset and the second available media asset, where a layout for the first available media asset and the second available media asset on the display is configured based on an amount of users in the first set of users as compared with an amount of users in the second set of users. For example, the media guidance application may calculate or retrieve a number of users in the first set and a number of users in the second set and compare those numbers. The media guidance application may generate a layout based on the numbers. For example, if the first set is twice as large as the second set, the media guidance application may generate a first window for displaying the first media asset and a second window for the second media asset in such a way that the first window is twice as large as the second window. For example, window 120 (FIG. 1) may be twice as large as window 110 (FIG. 1). In other examples, the display configuration may be based on additional characteristics of the audience such as user importance, proximity, and other factors.

In some embodiments, the media guidance application may adjust other aspects of the media presentation based on the composition of the audience. For example, the media guidance application may determine that the first user set and the second user set are comprised of approximately the same number of users. This may prompt the media guidance application to display both media assets in equally sized windows on the display device. However, the media guidance application may use a location detection feature such as GPS, facial recognition, or some other technique to determine that viewers belonging to the first user set are located farther from the viewing device than viewers in the second user set. In response to this determination, the media guidance application may increase the volume of the first media asset to accommodate for the differences in viewing locations. Further, differences in the content of media assets may prompt the media guidance application to adjust other aspects of the media display. For example, the media guidance application may search the metadata of the two media assets being displayed for the importance of color to the content. It may determine that one media asset, perhaps a news broadcast, does not rely heavily on color while the other media asset, perhaps a sports game, does rely heavily on color. In response, the media guidance application may make the news broadcast display in black and white while the sports game is displayed in full color. In another example, two media asset displays may overlap slightly due to the size and shape of the display device. The media guidance application may search the metadata of the two media assets to determine priority level of the content as it is broadcasted in order to determine which media asset to display in front. For example, certain portions of a news broadcast may be marked as high priority, which may prompt the media guidance application to place the news broadcast in front of a sports game. Additionally, certain portions of the sporting event such as the final few minutes of a game may be marked as high priority, prompting the media guidance application to display the sporting event in front of the news broadcast during that time period.

The media guidance application may identify a new user entering a location and retrieve that user's media asset preference profile. Specifically, the media guidance application may detect a new user proximate to the display device, and retrieve a media asset preference profile for the new user. For example, the display device may include a camera or another proximity sensor, and use that sensor to identify a new user within the proximity of the display. The media guidance application may use face recognition techniques to identify the user. In some embodiments, the media guidance application may identify the user based on a device (e.g., a smart phone) that the user is carrying. The media guidance application may use Bluetooth or other wireless standards to identify the user's device. Upon identification of the user, the media guidance application may retrieve a media asset preference profile of the user (e.g., over a network).

The media guidance application may determine, based on the user's media preference profile that the new user enjoys a specific type of media. Specifically, the media guidance application may determine that the new user has a media asset preference profile having the first characteristic. For example, the media guidance application may analyze the user's media preference profile and extrapolate the user's preference for media. For example, the media guidance application may analyze all the media that the user has consumed a determine the user's favorite genre. In some embodiments, the user's preference profile may be specific to a conference that is being attended. The location of the conference may include different lecture that are playing at the same time and can be displayed on a single display device (e.g., display device 100 of FIG. 1).

The media guidance application may retrieve a threshold ratio of users needed for changing the layout of the display. Specifically, the media guidance application may retrieve a threshold setting for the first set of users and the second set of users, the threshold setting indicative of an increment to either of the first set of users and the second set of users and relative to a total set of users in the first set of users and the second set of users. For example, the media guidance application may retrieve the threshold from memory or from a remote server. The threshold may be a ratio of a first set of users to the second set of users needed for a change, a percentage of users in the first set as compared to the second set needed for change, or another suitable value.

The media guidance application may determine whether adding the new user to one of the sets changes the relation of the sets to each other enough to warrant a change of layout of the two media assets. Specifically, the media guidance application may determine whether adding the new user to the first set of users changes the amount of users in the first set of users as compared with the amount of users in the second set of users by more than the threshold setting. For example, the threshold may include a ratio of users needed to change the layout of the display. The media guidance application may recalculate a total number of users in each of the sets. In some embodiments, the media guidance application may retrieve a number of users for each set. The media guidance application may calculate a ratio of the first number of users to the second number of users, and compare the ratio with a threshold ratio.

Figure 2:
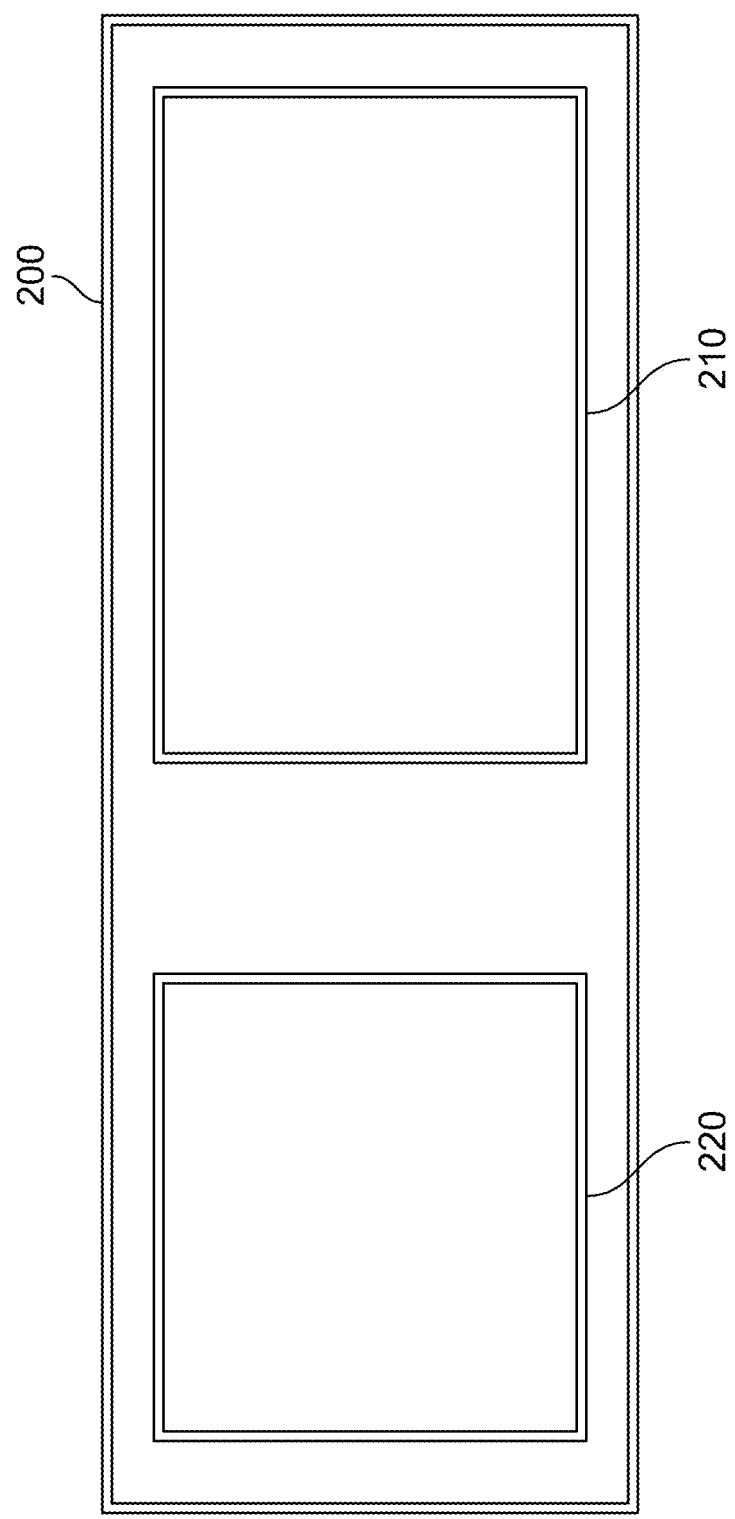
FIG. 2 shows an illustrative example of a display layout, in accordance with some embodiments of the disclosure.
Figure 3:
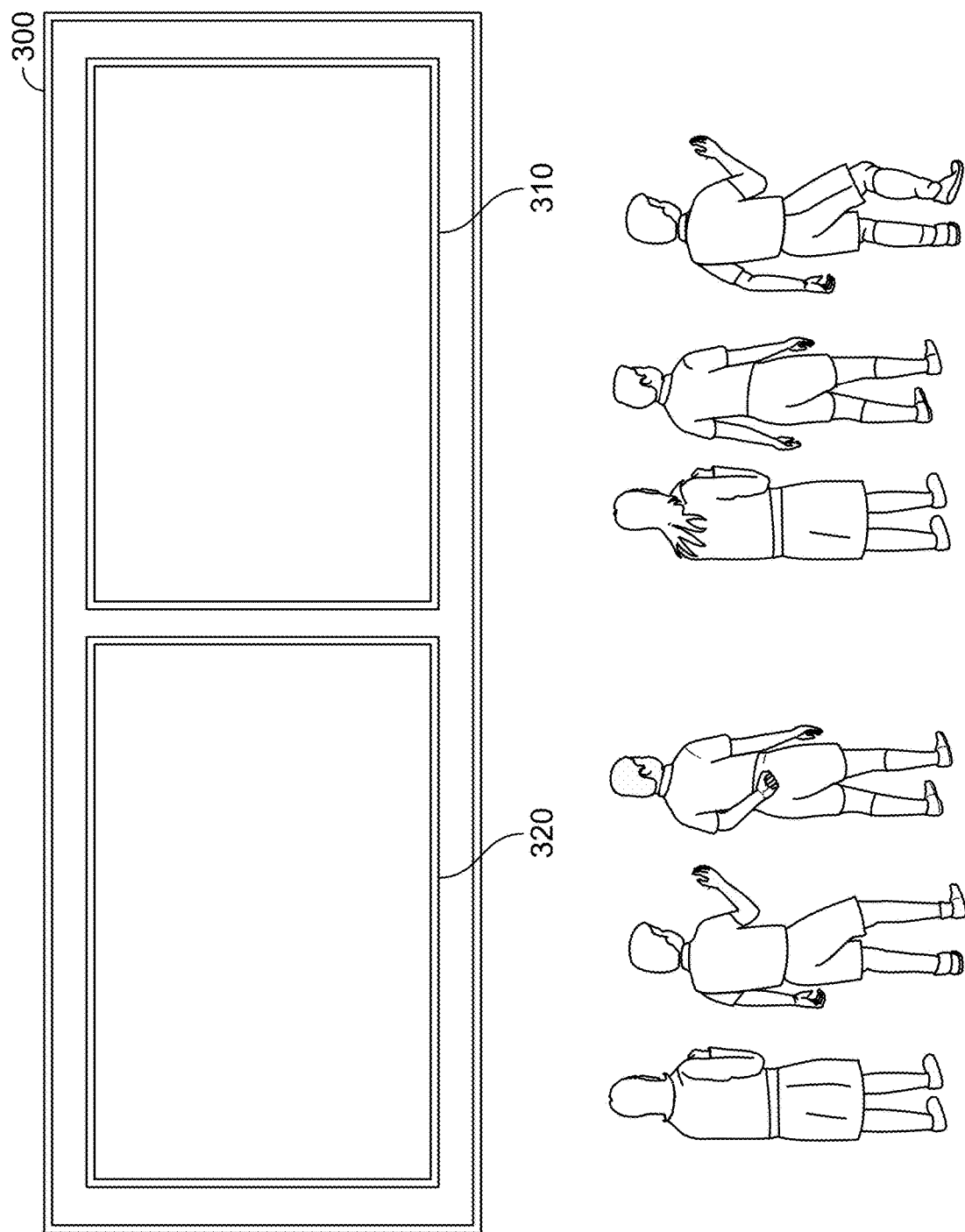
FIG. 3 shows another illustrative example of a display screen of a plurality of users consuming media assets from a display device that is able to display more than one media asset, in accordance with some embodiments of the disclosure.

If the change in the amount of the first set as compared with the second set creates two sets that are different by a threshold amount, the media guidance application may modify the layout of the screen. Specifically, the media guidance application may, in response to determining that adding the new user to the first set of users changes the amount of users in the first set of users as compared with the amount of users in the second set of users by more than a threshold setting, adjust the display layout of the first available media asset and the second available media asset according to the change. For example, the media guidance application may change the relative size of each displayed media asset. For example, display 100 may be adjusted by adjusting the size of window 110 and 120 respectively to create a display 200 (FIG. 2) with windows 210 with the same media asset as displayed in window 110 and window 220 with the same media asset as was displayed in window 120. In some embodiments, the size of the first media asset displayed may be directly proportional to the number of users in each set. For example, if there are 3 users in each set, each displayed media asset may be of equal size. As illustrated in FIG. 3, display 300 may be include two equal size windows (window 310 and window 320).

In some embodiments, the media guidance application may react appropriately when users leave the proximity of the display. For example, if enough users leave, the media guidance application may adjust the layout accordingly. The media guidance application may perform the following actions the reacting to users leaving the proximate location of the display. The media guidance application may detect that a user in the first set of users has left the field of view of the display. For example, the media guidance application may user a camera or another sensor to determine that the person has left the location (e.g., a person left the conference room, or a bar, or another suitable location). The media guidance application may track the user using a camera. In some embodiments, the media guidance application may use a proximity sensor within the user's smart phone to track the user.

The media guidance application may, in response, remove the user from the set/group that the user has been part of. Specifically, the media guidance application may remove the user of the first set of users that has left the field of view of the display from the first set of users. For example, the media guidance application may update a data structure within its memory to remove an entry from the data structure for the user that just left.

The media guidance application may recalculate the group membership responsive to change of the group composition (e.g., when a user is taken out of a group). Specifically, the media guidance application may determine a new amount of users in the first set of users without the user that has left the field of view. For example, the media guidance application may store each set of users in a corresponding data structure. The data structure may have an entry for a user count which may be updated (e.g., via an API) when users enter and leave the specific location. The media guidance application may update the entry when taking a user out of the data structure.

The media guidance application may determine whether the change in group membership creates user numbers in the group that exceeds a threshold. Specifically, the media guidance application may determine whether the new amount of users in the first set and the amount of users in the second set of users differ by more than the threshold setting. For example, the media guidance application may retrieve the threshold from memory. The threshold may be any of a percentage difference, a ratio, and an absolute number difference, or another suitable threshold. The media guidance may calculate the new relationship between the sets in terms of numbers of users and compare the result with the threshold.

In response to determining that a respective number of users in the updated sets changes the ratio of users by more than a threshold amount, the media guidance application may adjust the layout of the display. Specifically, the media guidance application may, in response to determining that the new amount of users and the amount of users in the second set of users exceeds the threshold setting, adjust the display layout of the first available media asset and the second available media asset based on the new amount of users in the first set of users as compared with an amount of users in the second set of users. For example, if the determination yields a result of the changed first and second set being greater than the threshold, the media guidance application may adjust the layout of the display. It should be noted that there may be several thresholds, one for each display configuration. For example, the media guidance application may store one threshold for when the windows are of the same size as illustrated in FIG. 3. That threshold may be for instances when the ratio of users changes from one to one to another value. A different threshold may be set for when the windows are of different size as illustrated in FIGS. 1 and 2. That threshold may be two to three or another suitable value.

In some embodiments, when the user leaves the location, the user may still want to continue consuming the media asset the user was consuming at that location. The media guidance application may accommodate that user. The media guidance application may detect that one of the users in the first set of users has left the field of view of the display. For example, the user may have left a conference room, or a bar. The user may be tracked with a camera, GPS device, or another sensor.

The media guidance application may identify other devices that the user can access. Specifically, the media guidance application may retrieve a set of alternate display devices available to the user that has left the field of view of the display. For example, the media guidance application may access the user's profile as illustrated in table 500 of FIG. 5. Table 500 may have two fields. Field 510 may store user identification information while field 520 may store device identifications that the user has access to. Some of the devices in the device map of FIG. 5 may be devices available in the location while some devices may be users' personal devices.

The media guidance application may determine which of the user's detected devices are able to access the media asset. Specifically, the media guidance application may determine whether the first available media asset is available for display on any of the alternate display devices. For example, the media guidance application may access each device in table 500 and determine the access rights of that device to the given media asset.

Figure 4:
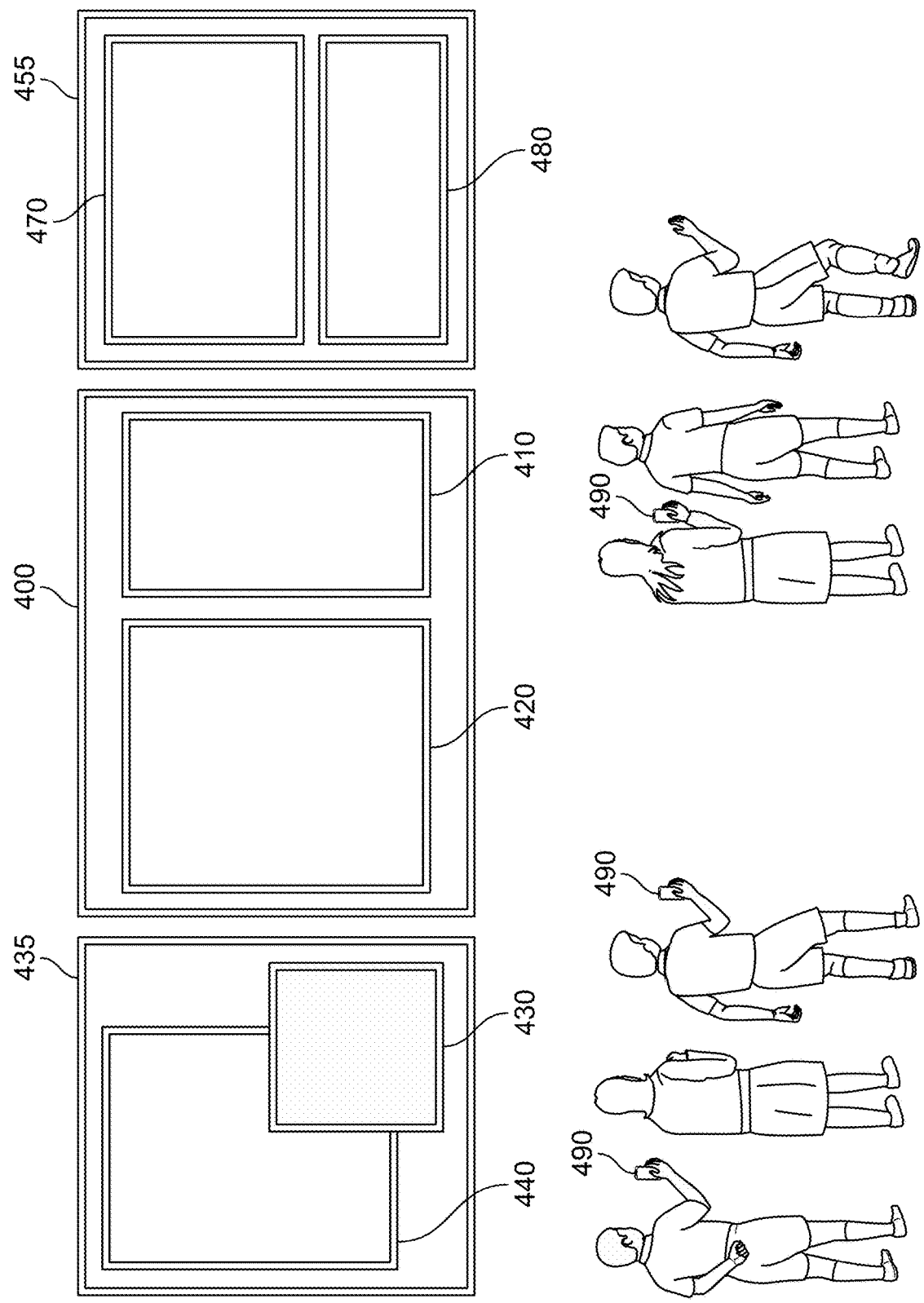
FIG. 4 shows an illustrative example of a plurality of users consuming media assets from a plurality of display devices that are able to display more than one media asset, in accordance with some embodiments of the disclosure.

Upon finding a device that can access and play the media asset that the user preferred in the location that the user has left, the media guidance application may play the media asset on that device. Specifically, the media guidance application may, in response to determining that the first available media asset is available for display on a first display of the set of alternate display, generate a display screen of the first available media asset on the first display. For example, FIG. 4 illustrates multiple available display devices. Display devices 435 400 and 455 are devices available for multiple users, while devices 490 are personal devices associated with a corresponding user. In some embodiments, the media guidance application, may download the media to the identified user's personal device and enable the user to play the media later time from the beginning or from the point when the user walked out of the location. However, this function may be unavailable for share device (e.g., devices 435 400 and 470).

In some embodiments, the media guidance application may adjust the layout of the display when one or more users start consuming the content available on the display on a different device (e.g., another display or their own smart phone). The media guidance application may detect that a user in the first set of users has begun viewing the first available media asset on an alternate device. For example, the media guidance application may be managing multiple display devices (e.g., in a conference space or a bar). Each display device may include a camera or another sensor that can detect that a user is looking at that display device versus another display device. The media guidance application may determine using the camera or a sensor that the user has turned away to another device. In some embodiments, the media guidance application may determine, using the camera or another sensor, that the user is now looking at the user's own device. FIG. 4 illustrates multiple devices (e.g., devices 435, 400, 470, and 490) that the user may be consuming data from. If the user was consuming media from device 400 and switched to device 435, a camera may track that change (e.g., by detecting that the user's gaze changed from device 400 to device 435). In some embodiments, the user's gaze may change to the user's own device 490.

The media guidance application may upon detecting that the user is consuming the media content from a different device, recalculate the numbers of the different groups of users that are viewing media from the display. Specifically, the media guidance application may remove the user of the first set of users that has begun viewing the first available media asset on the alternate device and determine a new amount of users in the first set of users without the user that has begun viewing the first available media asset on the alternate device. For example, if the user was watching device 400 (FIG. 4) and switched to watched device 435 (FIG. 4), the media guidance application may remove the user from the appropriate set for device 400 and calculate the new number of users in the set. In some embodiments, the media guidance application may recalculate the number of users watching device 435 when adding the user to the appropriate set.

The media guidance application may determine whether the new number of users in the first set changes the difference between the numbers in the first and second sets by more than a threshold amount. Specifically, the media guidance application may determine whether the new amount of users in the first set and the amount of users in the second set of users differ by more than the threshold setting. For example, if after the user that was removed from the first set changed the ratio of the number of users in the first set to the second set in such a way that the ratio is now lower than 2 to 1, the media guidance application may change the layout of the display. Specifically, in response to determining that the new amount of users and the amount of users in the second set of users exceeds the threshold setting, adjusting the display layout of the first available media asset and the second available media asset based on the new amount of users in the first set of users as compared with an amount of users in the second set of users.

In some embodiments, when the media guidance application detects that a new user is proximate to the display device, the media guidance application may attempt to determine the importance of the new user. The determination of the new user's importance may be performed using a combination of sensing components and user profile information. The media guidance application may identify the new user such as facial or voice recognition technology, scanning a personal electronic device (ie. a smartphone), or scanning an employee badge. The media guidance application may then retrieve the user's profile and search the metadata in the user's profile for information relevant to the media viewing location. Such information may include job title, celebrity status, personal and professional connections, and a number of other details. For example, the media guidance application may review the new user's job history and identify the new user as the owner of a bar in which media is playing. Depending on the settings of the media guidance application, this may cause the system to prioritize this particular user over all other factors. For example, the media guidance application may assign the bar owner to a set of viewers, such as the first out of two sets of users. The media guidance application may then display more prominently the content corresponding to the set of users to which the bar owner belongs, even if the bar owner belongs to the smaller of the two sets of users. As another example, the media guidance application may determine that the new user who has entered a conference room is the company's president. The media guidance application may accomplish this by using sensing components to identify the new user and the new user's profile. The media guidance application may then recognize that every user in the room is employed by the same company and may pull up the internal hierarchy of the company. Based on this information and the metadata in each user's profile, the media guidance application may determine that the company president is significantly higher in rank than every other user in the room. In response, the media guidance application may display more prominently content that corresponds to the preferences of the set of users to which the president belongs, regardless of the ratio of the two sets of users.

In some embodiments, the media guidance application may use the importance of viewers to weigh each viewer's impact on the content display relative to other viewers. For example, the media guidance application may recognize that the bar owner is present in a bar with 50 other users and assign the bar owner to the first of two user sets. In order to determine viewer importance, the media guidance application may retrieve each user's profile and search the metadata for information related to the location, such as relation to the business, job status within the business, frequency of visit, personal and professional connections, and other relevant information. This search may yield results that indicate that the bar owner is very important to the business and does not frequent the bar very often. The results may further indicate that most of the other users at the location are locals who frequent the bar often but do not have any special connection to the establishment. Based on its determination of viewer importance, the media guidance application may determine that all users' preferences should be weighted equally except for the bar owner, who should be weighted 30 times as heavily as each other user. In this example, it is possible that the media asset corresponding to the first user set may be displayed as prominently as or more prominently than the media asset corresponding to the second user set even if the first user set is much smaller than the second user set.

In some embodiments, the media guidance application may generate for display two programs sized according to the display size and the ratio of the number of users preferring the first program versus the second program. Specifically, the media guidance application may retrieve information for the display device, the information indicating a size of the display. For example, the control circuitry may retrieve the resolution of the display device (e.g., 1,920×1,080) or size of the display (e.g., 55 inches).

The media guidance application may generate for display the two programs according to the display size (and/or resolution). Specifically, the media guidance application may generate a display screen for the display device having a first window for the first available media asset, the first window sized according to the size of the display and a ratio of the first set of users to the second set of users, and generate a second window in the display screen for the display device, the second window sized according to the size of the display and a ratio of the second set of the users to the first set of users. For example, if the first set of users includes one third of the users and the second set of users includes two thirds of the users, the media guidance application may generate the first program using one third of the retrieved display size/resolution and the second program using two thirds of the display size/resolution. FIG. 4 illustrates different devices of different sized (e.g., devices 400, 435). Each of the devices is configured with different display configurations according to the size of the device. Device 435 is configured with windows 430 and 440 that have one display configuration according to the size of the device. Device 400 is of a different size and is configured with windows 410 and 420 according to the size of the device. Device 470 is again of a different size is configured differently according to its size. Windows 470 and 480 are in a different configuration from windows 410 and 420, and 430 and 440.

In some embodiments, the media guidance application may distribute the audio/subtitle data for different programs that are being displayed on the display device. Specifically, the media guidance application may in response to determining that the amount of users in the first set of users is greater than the amount of users in the second set of users, play an audio output for the first available media asset on the display device and generating a display of closed caption content for the second available media asset. For example, if the first media asset is preferred by more viewers than the second media asset, the media guidance application may play the sound of the first media asset and show closed captions/subtitles for the second media asset.

In some embodiments, the media guidance application may determine other devices available for users that prefer a program that does not have the associated audio playing and play the audio of that program on an available device. Specifically, the media guidance application may retrieve a table of assignments of users in the second set of users and devices available for the second set of users and identify a second available device for one of the second set of users. For example, the media guidance application may store a table for every user of devices that the user may be able to hear if the audio is played from those devices. The media guidance application may identify those devices for one or more users that prefer the sports game versus the news program. The media guidance application may play an audio output for the second available media asset on the second available device for the one user of the second set of users. For example, if the determination is made for device 400 (FIG. 4), the media guidance application may play the audio on device 435 or on a person device 490.

In some embodiments, the media guidance application may determine whether adding the new user to the first set of users changes the amount of users in the first set of users as compared with the amount of users in the second set of users by more than the threshold setting using the following actions. The media guidance application may calculate the amount of users in the first set of users after adding the new user, and calculate the amount of users in the second set of users. The media guidance application may calculate a ratio of the users who prefer the first media asset and the second media asset. Specifically, the media guidance application may determine a ratio of the amount of users in the first set of users to the second set of users, and compare the first ratio and the second ratio to the threshold setting. For example, the media guidance application may calculate the number of users in the first set and a second set and device the first number by the second number to get the ratio. The media guidance application may retrieve the threshold in the form a threshold ratio and compare the two. Thus, the media guidance application may determine whether the ratio of users of the first set to the second set exceeds the threshold.

The media guidance application may, in addition, to a number of users in both sets use a priority level of each of the two media assets to determine the layout of the display. Specifically, the media guidance application may retrieve a priority level for the first available media asset and the second available media asset, and determine that the priority level for the first available media asset is higher than the priority level of the second available media asset. For example, originally the first media asset may be of a higher priority than the second media asset. For example, because more users prefer the first media asset than the second media asset. The media guidance application may determine that an event has occurred in the second media asset that may interest the user. The media guidance application may in response change the priority of the media assets being displayed. The media guidance application may update the display screen layout configuration based on the priority level by increasing a size of a display of the first available media asset to a size associated with the priority level.

In some embodiments, the media guidance application may monitor the priority levels of each media asset, and update those priorities based on what's happening on those media asset. Specifically, the media guidance application may update one or more of the priority level of the first available media asset and the priority level of the second available media asset based on a change in content in one or more of the first available media asset and the second available media asset. For example, if there is an interesting moment in the sports game, the media guidance application may increase the size of the sports game on the display.

In some embodiments, the media guidance application may add each of a plurality of users proximate to a display device, to a first set of users or a second set of users with the following actions. The media guidance application may retrieve a respective media asset preference profile for each of the plurality of users. For example, the media guidance application may retrieve each profile from a server. Each profile may include one more media asset characteristics that the user prefers. User profile 600 of FIG. 6 illustrates a possible profile of the user. Each user profile may include a user identification field 610. The user identification field may be a unique value identifying the user. User profile 600 may also include attributes field 620. Attributes field 620 may include preferences of the user. In some embodiments, user profile 600 may be unique for a specific event (e.g., a conference). The user profile in this instance may store a user's preferences for a specific conference (e.g., topics of interest at the conference).

The media guidance application may retrieve characteristics of the media assets available for display. Specifically, the media guidance application may retrieve the first characteristic for the first available media asset and the second characteristic for the second available media asset. For example, the media guidance application may retrieve a genre of each media asset. In some embodiments, the media guidance application may retrieve topics associated with a conference that the user prefers. The user profile may be retrieved from storage or from a remote server. The media guidance application may, in response to matching a first of the media asset preference profiles for the plurality of users with the first characteristic, assign a respective user associated with the matching first media asset preference profile to the first set of users. The media guidance application may, in response to matching the first of the media asset preference profiles for the plurality of users with the second characteristic, assig the respective user associated with the matching first media asset preference profile to the second set of users.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 7:
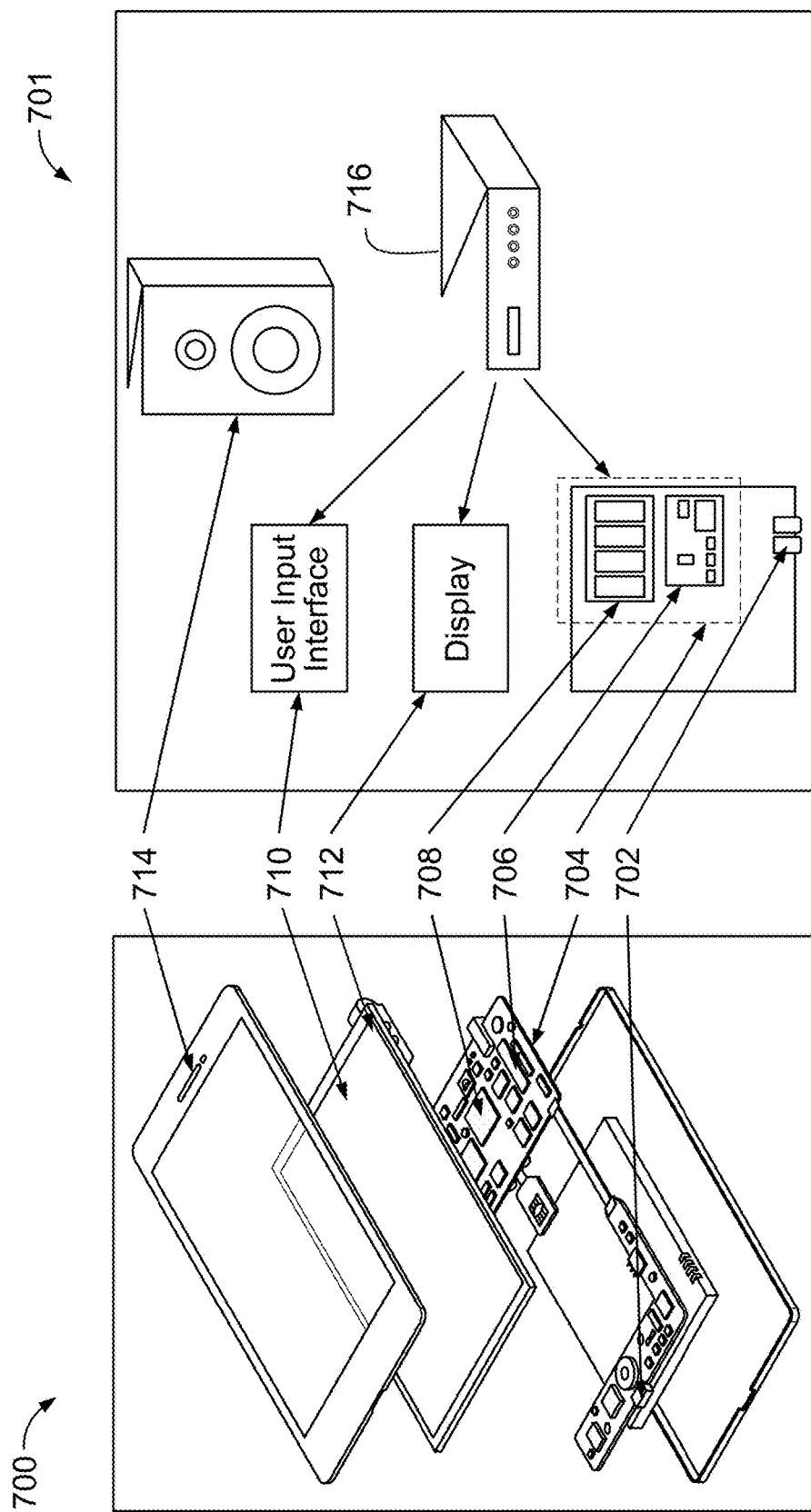
FIG. 7 is a block diagram of an illustrative user equipment device in accordance with some embodiments of the disclosure.

Users may access content and the media guidance application (and its display screens described above and below) from one or more of their user equipment devices. FIG. 7 shows generalized embodiments of illustrative user equipment devices 500 and 501. For example, user equipment device 500 may be a smartphone device. In another example, user equipment system 501 may be a user television equipment system. User television equipment system 501 may include a set-top box 516. Set-top box 516 may be communicatively connected to speaker 514 and display 512. In some embodiments, display 512 may be a television display or a computer display. In some embodiments, set top box 516 may be communicatively connected to user interface input 510. In some embodiments, user interface input 510 may be a remote control device. Set-top box 516 may include one or more circuit boards. In some embodiments, the circuit boards may include processing circuitry, control circuitry, and storage (e.g., RAM, ROM, Hard Disk, Removable Disk, etc.). In some embodiments, circuit board 324 may include an input/output path. More specific implementations of user equipment devices are discussed below in connection with FIG. 8. Each one of user equipment device 700 and user equipment system 701 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software miming on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment system 701. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of each one of user equipment device 700 and user equipment system 701 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on each one of user equipment device 700 and user equipment system 701. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on each one of user equipment device 700 and user equipment system 701 is retrieved on-demand by issuing requests to a server remote to each one of user equipment device 700 and user equipment system 701. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
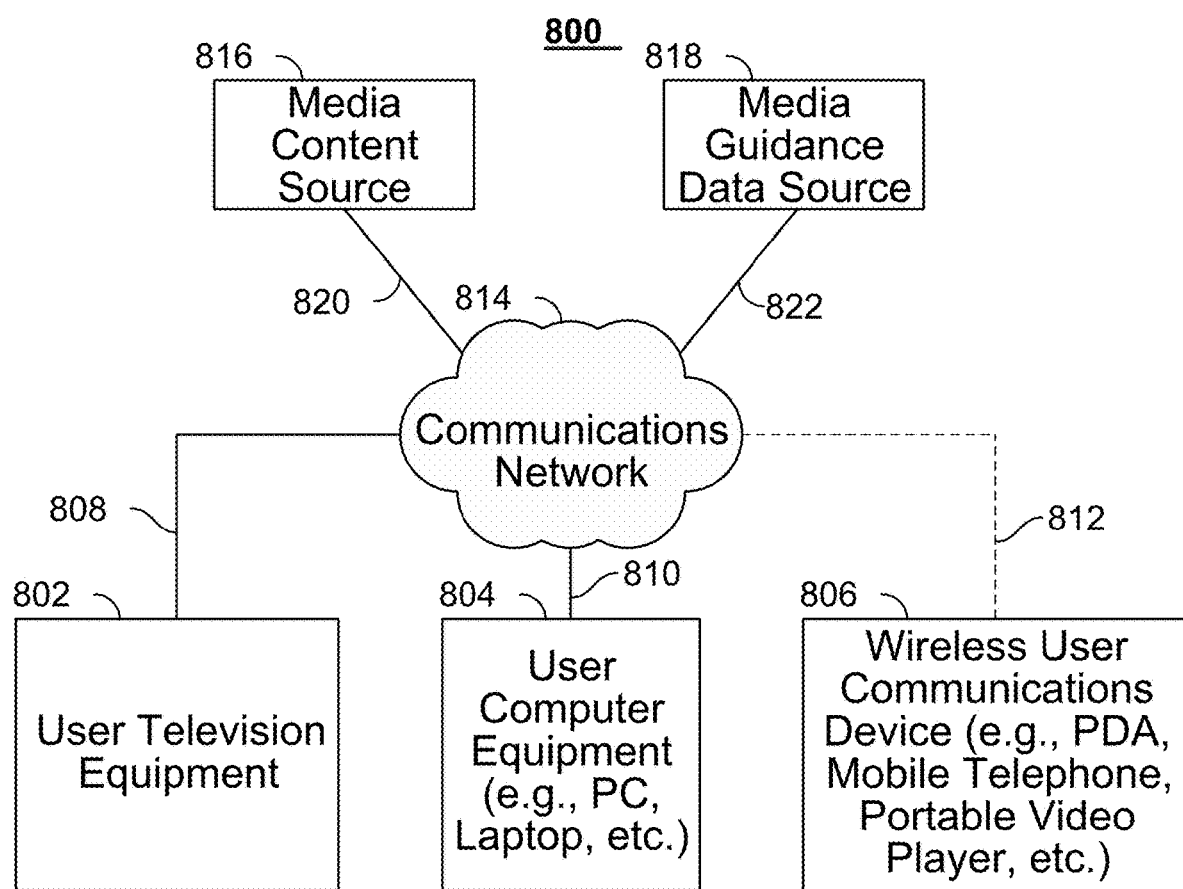
FIG. 8 is a block diagram of an illustrative media system in accordance with some embodiments of the disclosure.

Each one of user equipment device 700 and user equipment system 701 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of each one of user equipment device 700 and user equipment system 701. In some embodiments, media guidance applications may be client-server applications where only a client application resides on the user equipment device, and server application resides on a remote server. For example, media guidance applications may be implemented partially as a client application on control circuitry 704 of each one of user equipment device 700 and user equipment system 701 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
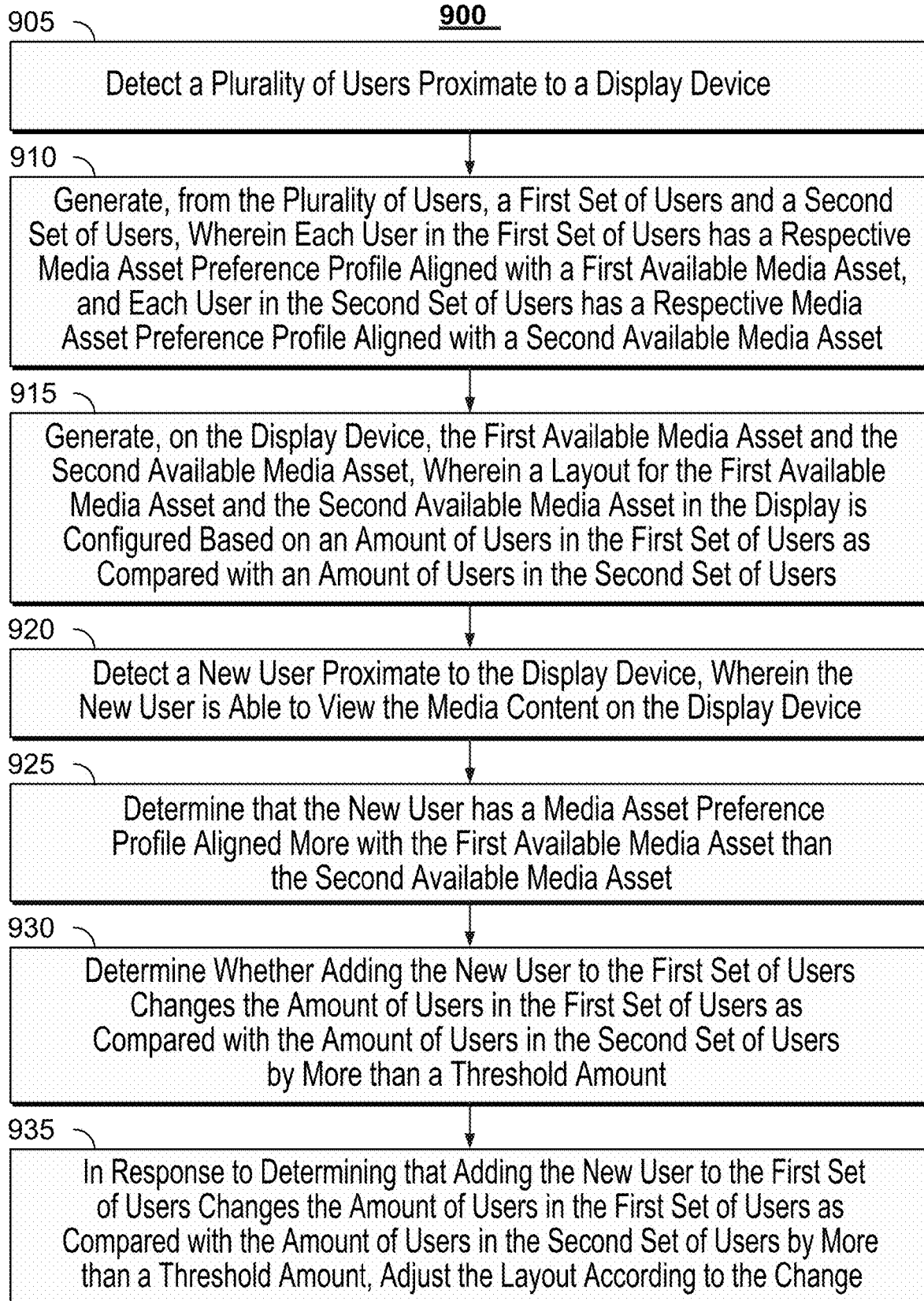
FIG. 9 depicts an illustrative flowchart of a process for delivering multiple media assets for a plurality of users, in accordance with some embodiments of the disclosure.
Figure 10:
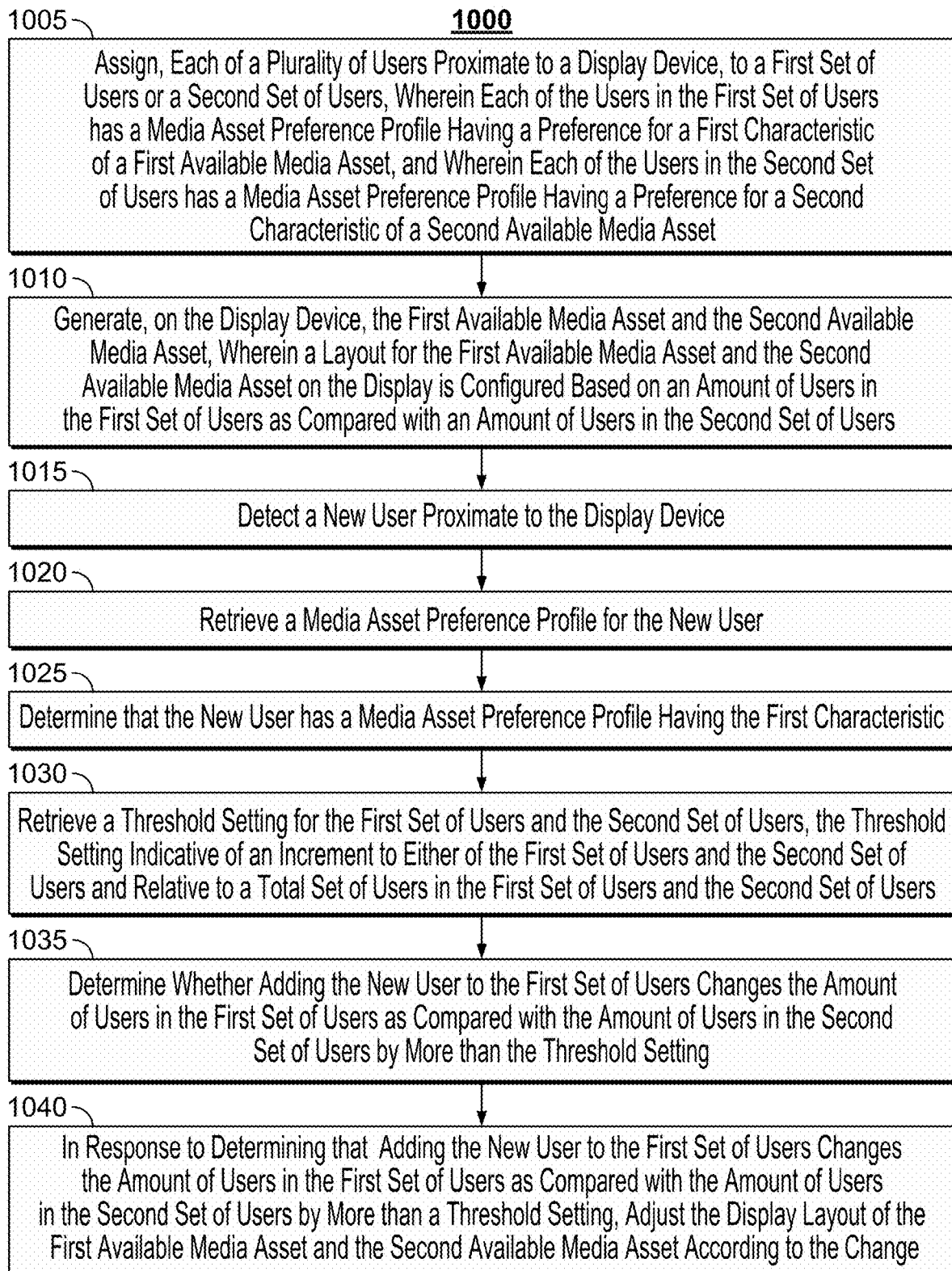
FIG. 10 depicts another illustrative flowchart of a process for delivering multiple media assets for a plurality of users, in accordance with some embodiments of the disclosure.

FIG. 9 depicts an illustrative flowchart of a process for delivering multiple media assets for a plurality of users, in accordance with some embodiments of the disclosure. Process 900, and any of the following processes, may be executed by control circuitry 704 (e.g., in a manner instructed to control circuitry 704 by the media guidance application). Control circuitry 704 may be part of user equipment (e.g., a device which may have any or all of the functionality of user television equipment 802, user computer equipment 804, and/or wireless communications device 806), or of a remote server separated from the user equipment by way of communication network 814, or distributed over a combination of both.

At 905, control circuitry 704 detects users that are proximate to a display device who are able to view media content on the display device. For example, the control circuitry 704 may instruct an input/out interface, e.g., a camera or a set of cameras, to detect faces within the field of vision of the camera. In some embodiments, the control circuitry 704 may use a stereoscopic camera or cameras to detect distance between a camera and the users in the cameras field of view.

At 910, the control circuitry 704 generates a first set of users and a second set of users from the detected user. For example, the control circuitry 704 may place a user into the first set of users based on that user's media asset preference profile being aligned with a first available media asset, and the control circuitry 704 may place a user in the second set of users based on that user's respective media asset preference profile being aligned with a second available media asset. In some embodiments, the control circuitry 704 may, using communication circuitry, contact an information source, profile server, or other user information repository using, e.g., a communication network 814.

At 915, the control circuitry 704 generates, on a display device, e.g., display 712, the first available media asset and the second available media asset. For example, the control circuitry 704 may determine a layout for the first available media asset and the second available media asset in the display based on an amount of users in the first set of users as compared with an amount of users in the second set of users. In some embodiments, the control circuitry 704 adjusts the size of the media assets. In some embodiments, the control circuitry 704 adjusts the positions of the media assets in the display relative to a critical mass of the viewing angle of users in the first and second sets.

At 920, the control circuitry 704 detects a new user proximate to the display device that is able to view the media content on the display device. For example, the control circuitry 704 may continuously monitor a video or picture feed from a camera as described above, and, as individuals enter the frame, identify those users a new user.

At 925, the control circuitry 704 determines that the new user has a media asset preference profile aligned more with the first available media asset than the second available media asset. For example, the control circuitry 704 may contact, using communication circuitry, a profile server or other information repository housing user information. In some embodiments, the control circuitry 704 may extract portions of the profile for the new user and compare those extracted portions with attributes of each media asset.

At 930, the control circuitry 704 determines whether adding the new user to the first set of users changes the ratio of users in the first and second set of users by a threshold amount. The threshold of change may be configurable, i.e., changeable from a user, may be stored remotely, i.e., on a remote server, or may be hardcoded in instructions provided to the control circuitry 704.

At 935, the control circuitry 704, in response to determining that adding the new user to the first set of users changes the amount of users in the first set of users as compared with the amount of users in the second set of users, i.e., the ratio, by more than a threshold amount, adjusts the layout according to the change. For example, the control circuitry 704 may change the position of the media assets in display 712.

FIG. 812 depicts another illustrative flowchart of a process for delivering multiple media assets for a plurality of users, in accordance with some embodiments of the disclosure. At 1005, control circuitry 704 assigns each of a plurality of users proximate to a display device to a first set of users or a second set of users. For example, the control circuitry 704 may instruct an input/out interface, e.g., a camera or a set of cameras, to detect faces within the field of vision of the camera. In some embodiments, the control circuitry 704 may use a stereoscopic camera or cameras to detect distance between a camera and the users in the cameras field of view. The control circuitry 704 then assigns users to the sets of users by, for example, the user's preferences. For example, control circuitry 704 may assign users in the first set of users based on having a media asset preference profile having a preference for a first characteristic of a first available media asset and assign users in the second set of users based on having a media asset preference profile having a preference for a second characteristic of a second available media asset.

At 1010, control circuitry 704 generates, on the display device, e.g., display 712, the first available media asset and the second available media asset. For example, the control circuitry 704 may determine a layout for the first available media asset and the second available media asset on the display, e.g., display 712, based on an amount of users in the first set of users as compared with an amount of users in the second set of users.

At 1015, the control circuitry 704 detects a new user proximate to the display device. For example, the control circuitry 704 may use a user input interface, e.g., a camera, to detect faces in the field of view and detect when new faces enter the frame.

At 1020, control circuitry 704 retrieves a media asset preference profile for the new user. For example, control circuitry 704 may contact, using communication circuitry, a remote server, an information source, or other storage containing information about user profiles. In some embodiments, the control circuitry 704 may retrieve profiles from storage 708.

At 1025, the control circuitry 704 determines that the new user has a media asset preference profile that indicates the new user has a preference for the first characteristic. For example, the control circuitry 704 may analyze the preference information about the new user to determine that a genre of the media asset, e.g., a sports game, matches the genre of a media asset.

At 1030, the control circuitry 704 retrieves a threshold setting for the first set of users and the second set of users, the threshold setting indicative of an increment to either of the first set of users and the second set of users and relative to a total set of users in the first set of users and the second set of users. For example, control circuitry 704 may retrieve the threshold setting from storage 208. The threshold of change may be configurable, i.e., changeable from a user, may be stored remotely, i.e., on a remote server, or may be hardcoded in instructions provided to the control circuitry 704.

At 1040, control circuitry 704 determines whether adding the new user to the first set of users changes the amount of users in the first set of users as compared with the amount of users in the second set of users by more than the threshold setting, In response to determining that adding the new user to the first set of users changes the amount of users in the first set of users as compared with the amount of users in the second set of users by more than a threshold setting, the control circuitry 704 adjusts the display layout of the first available media asset and the second available media asset according to the change.

Figure 11:
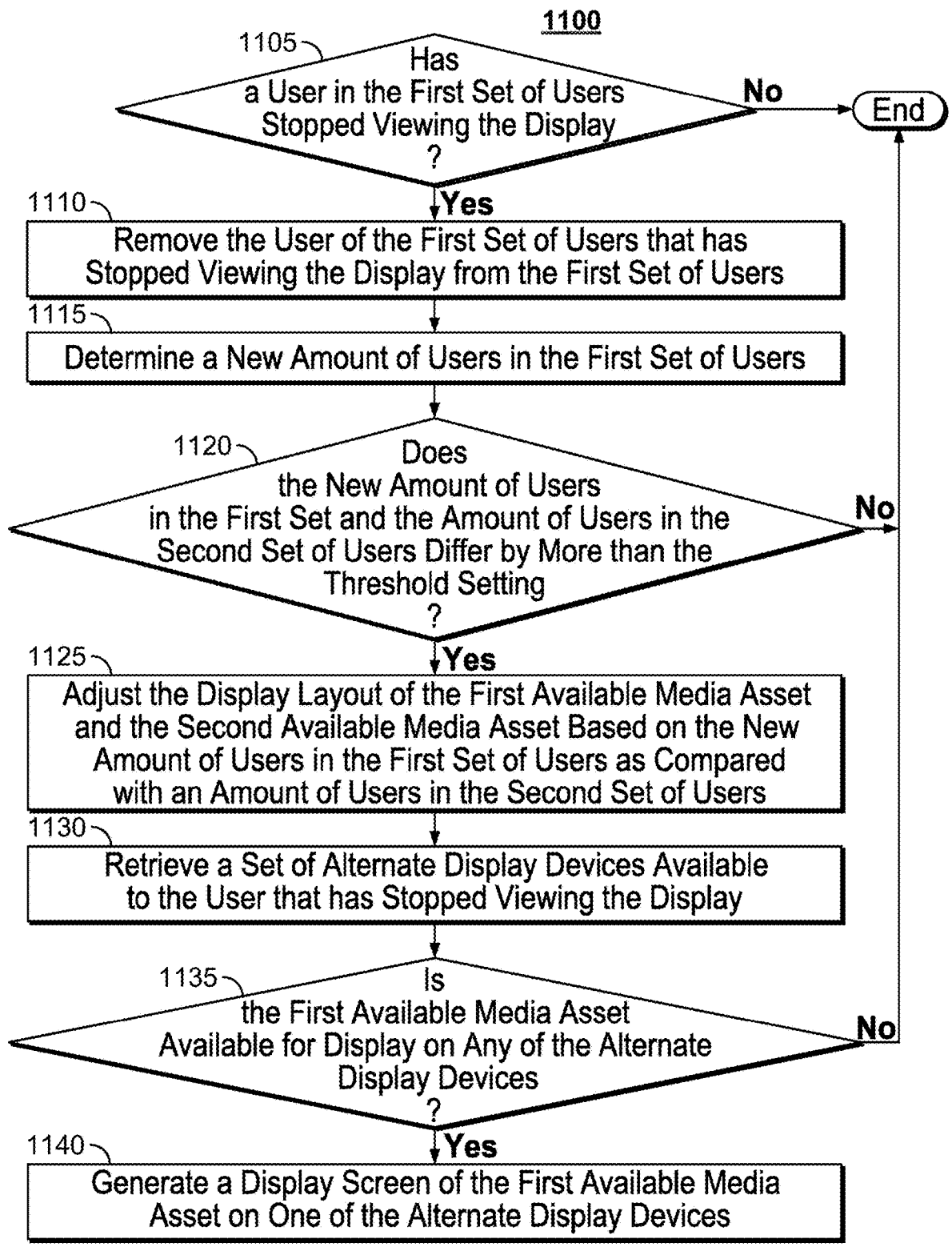
FIG. 11 depicts another illustrative flowchart of a process for adjusting the display layout of media assets, in accordance with some embodiments of the disclosure.

FIG. 11 depicts another illustrative flowchart of a process for adjusting the display layout of media assets, in accordance with some embodiments of the disclosure. At 1105, control circuitry 704 detects whether a user in the first set of has stopped viewing the display. In some embodiments, the control circuitry 704 may determine the user has left the field of view of the display. In some embodiments, the control circuitry 704 may use a camera in combination with gaze detection techniques to determine the user is not watching the display. If the control circuitry 704 determines a user has stopped viewing the display, then process 1100 continues at 1110.

At 1110, control circuitry 704 removes the user of the first set of users that has stopped viewing the display, e.g., left the field of view of the display, from the first set of users. For example, the control circuitry 704 may maintain a list of identifiers for active users in each set of users and remove the identifier of users that are no longer watching the display.

At 1115, control circuitry 704 determines a new amount of users in the first set of users without the user that has left the field of view. For example, control circuitry 704 may access a list of users in the first set and perform operations to determine the count of identifiers in the list.

At 1120, control circuitry 704 determines whether the new amount of users in the first set and the amount of users in the second set of users differ by more than the threshold setting. The threshold of change may be configurable, i.e., changeable from a user, may be stored remotely, i.e., on a remote server, or may be hardcoded in instructions provided to the control circuitry 704. If control circuitry 704 determines that the new amount of users in the first set and the amount of users in the second set of users differ by more than the threshold setting, then process 1100 continues at 1125.

At 1125, control circuitry 704, in response to determining that the new amount of users and the amount of users in the second set of users exceeds the threshold setting, adjusts the display layout of the first available media asset and the second available media asset based on the new amount of users in the first set of users as compared with an amount of users in the second set of users. For example, if control circuitry 704 determines that the amount of users in the first set of users is larger than the second set of user then the control circuitry 704 may make the display of the first media asset larger than the display of the second media asset in display 712.

At 1130, control circuitry 704 retrieves a set of alternate display devices available to the user that has left the field of view of the display. For example, control circuitry 704 may retrieve, using e.g., communication circuitry, a list of devices associated with an identifier of the user. This list may include information identifying smartphones, tablets, personal computers, virtual reality headsets, augmented reality headsets, or other displays.

At 1135, control circuitry 704 may determine whether the first available media asset is available for display on any of the alternate display devices. For example, control circuitry 704 may determine whether the user that stopped viewing the media asset is authorized to view the media asset on a smartphone. If control circuitry 704 determines that the first available media asset is available for display on any of the alternate display devices then process 1100 continues at 1140.

At 1140, the control circuitry 704, in response to determining that the first available media asset is available for display on a first display of the set of alternate display, generates a display screen of the first available media asset on the first display. For example, control circuitry 704 may generate playback of the media asset on a display of wireless communications device 806.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating for display a content item on a display device;

detecting a plurality of users within a threshold distance of the display device;

categorizing the plurality of users into a first group and a second group, wherein the display device simultaneously displays a first layout for a first content item for the first group and a second layout for a second content item for the second group;

monitoring whether one or more users from the first group or the second group are concurrently using a different device; and in response to determining that one or more users from the first group or the second group are concurrently using a different device:

calculating the number of users using a different device; and displaying a larger layout for either the first group or the second group based on the number of users in the respective groups having a larger number of users than the other group that are not concurrently using another device.

2. The method of claim 1, wherein, monitoring whether one or more users from the first group or the second group are concurrently using a different device further comprises: tracking the user's gaze to determine whether the user is looking at the different device.

3. The method of claim 2, wherein, the tracking is performed using a camera associated with the display device.

4. The method of claim 3, further comprising, obtaining data captured by the camera to determine if the gaze of the user changed from the display to another device or vice versa.

5. The method of claim 4, wherein, in response to determining that the gaze of the user changed from the display to another device, associating the change in gaze with the user consuming data from the other device.

6. The method of claim 4, wherein, in response to determining that the gaze of the user changed from the another device to the display, associating the change in gaze with the user consuming data from the display device.

7. The method of claim 4, further comprising, recalculating a total number of users associated with the first group or the second group when a determination is made that one or more users in the respective groups have changed their gaze from the display to another device or vice versa.

8. The method of claim 2, wherein, the tracking is performed using a sensor.

9. The method of claim 1, wherein, the first content item for the first group is not the same content as the second content item for the second group.

10. The method of claim 1, wherein, the first content item s associated with a genre that is different that the genre associated with the second content item.

11. The method of claim 1, further comprising, increasing or decreasing the first layout based on a change in number of users in the first group changing their gaze from the display device to another device or vice versa.

12. A system, comprising:
communication circuitry configured to access a display device for displaying a first content and a second content; and
control circuitry configured to:
generate for display a content item on the display device;
detect a plurality of users within a threshold distance of the display device;
categorize the plurality of users into a first group and a second group, wherein the display device simultaneously displays a first layout for the first content item for the first group and a second layout for the second content item for the second group;
monitor whether one or more users from the first group or the second group are concurrently using a different device; and
in response to determining that one or more users from the first group or the second group are concurrently using a different device:
calculate the number of users using a different device; and
display a larger layout for either the first group or the second group based on the number of users in the respective groups having a larger number of users than the other group that are not concurrently using another device.

13. The system of claim 12, wherein, the control circuitry configured to monitor whether one or more users from the first group or the second group are concurrently using a different device is further configured to:
track the user's gaze to determine whether the user is looking at the different device.

14. The system of claim 13, wherein, the control circuitry configured to track the user's gaze is configured to use a camera associated with the display device.

15. The system of claim 14, further comprising, the control circuitry configured to obtain data captured by the camera to determine if the gaze of the user changed from the display to another device or vice versa.

16. The system of claim 15, wherein, in response to determining that the gaze of the user changed from the display to another device, the control circuitry configured to associate the change in gaze with the user consuming data from the other device.

17. The system of claim 15, wherein, in response to determining that the gaze of the user changed from the another device to the display, the control circuitry configured to associate the change in gaze with the user consuming data from the display device.

18. The system of claim 12, further comprising, the control circuitry configured to recalculate a total number of users associated with the first group or the second group when a determination is made that one or more users in the respective groups have changed their gaze from the display to another device or vice versa.

19. The system of claim 14, wherein, the control circuitry configured to track the user using a sensor.

20. The system of claim 12, further comprising, the control circuitry configured to increase or decrease the first layout based on a change in number of users in the first group changing their gaze from the display device to another device or vice versa.

* * * * *